United States Patent [19]
Engle

[11] 3,937,430
[45] Feb. 10, 1976

[54] METHOD AND APPARATUS FOR CONTROLLING THE SPEED OF A VEHICLE

[75] Inventor: Thomas H. Engle, Cape Vincent, N.Y.

[73] Assignee: General Signal Corporation, Rochester, N.Y.

[22] Filed: Jan. 23, 1975

[21] Appl. No.: 543,202

Related U.S. Application Data

[62] Division of Ser. No. 337,990, March 5, 1973, Pat. No. 3,887,239.

[52] U.S. Cl. ........ 246/182 B; 137/625.69; 180/82 R
[51] Int. Cl.² .......................................... B61B 13/00
[58] Field of Search ...... 180/103, 105 R, 82 R, 108; 303/21 BB, 21 EB, 21 BE, 21 B; 188/181 C; 324/161; 317/5; 246/182 B; 137/625.69; 340/263

[56] References Cited
UNITED STATES PATENTS

| | | |
|---|---|---|
| 3,280,842 | 10/1966 | Weisenbach ............... 137/625.69 X |
| 3,381,771 | 5/1968 | Granger et al. ................. 180/105 R |
| 3,406,721 | 10/1968 | Jenney ........................... 137/625.69 |
| 3,450,444 | 6/1969 | Ballard .......................... 303/21 EB |
| 3,667,813 | 6/1972 | Burckhardt et al. ......... 188/181 CX |
| 3,803,574 | 4/1974 | Logue .......................... 188/181 CX |
| 3,887,239 | 6/1975 | Engle ............................... 303/21 B |

Primary Examiner—Trygve M. Blix
Assistant Examiner—Douglas C. Butler
Attorney, Agent, or Firm—Harold S. Wynn

[57] ABSTRACT

Apparatus is provided for controlling the speed of a vehicle, especially vehicles of a railway train, wherein acceleration-imparting mechanisms associated with the wheels are adjusted on an individual basis by comparison of tangential speed and desired speed by the use of sensors to maintain the tangential speeds of the wheels equal to each other, and equal to a predetermined value. The technique may be employed in either the braking or the propulsion mode of operation, or in both modes, and allows commanded rates of vehicle acceleration to be realized to the greatest possible extent.

5 Claims, 6 Drawing Figures

3,937,430

METHOD AND APPARATUS FOR CONTROLLING THE SPEED OF A VEHICLE

CROSS-REFERENCE TO RELATED APPLICATIONS

This invention relates to a co-pending application Ser. No. 302,415, filed Oct. 31, 1972, now abandoned in favor of continuation application Ser. No. 483,843, filed June 21, 1974. This is a division of application Ser. No. 337,990, filed Mar. 5, 1973, now Pat. No. 3,887,239.

BACKGROUND AND SUMMARY OF THE INVENTION

In general, the systems used to control the friction brakes on vehicles, be they railway trains, aircraft or automobiles, carry out braking commands by applying to the friction elements forces sized to the command. Selection of the relationship between the command an the resulting braking force involves assumptions regarding those factors, such as the coefficient of friction of the braking elements and the adhesion of the wheels, which affect vehicle motion. Therefore, the braking force levels are chosen on an assumed average performance. As a result, under any given set of conditions, some wheels may be braked too much and others may be braked too little. Because of this, only approximate correspondence between commanded acceleration and actual acceleration is afforded.

The adverse effects of the assumptions involved in the design of the traditional brake system are manifest in various forms, e.g. excessive stopping distances, excessive wheel wear resulting from slip, and the creation of flat spots on the wheels or the complete loss of steering control resulting from locked or sliding wheels. In an effort to improve performance, various refinements has been proposed. One involves weight sensing apparatus which reduces the braking forces on a localized basis as the load borne by the wheel, and consequently its adhesion, is reduced. Another type of refinement is the wheel slip control which releases and then reapplies individual brakes when slipping of the associated wheel is detected. A third remedial measure consists of a torque feedback system which is intended to linearize the relationship between the commanded force (or pressure) applied to the friction element and the friction force developed between this element and its cooperating braking part. While these expedients do improve performance, all are complex and increase substantially the cost of manufacturing and maintaining the system. Moreover, and more important, this auxiliary apparatus performs an override of reaction role and thus is incapable of deriving from each wheel all of the braking effort which its localized adhesion will support. Therefore, even with the auxiliary equipment, the system still affords stopping distances much longer than the theoretical minimum.

One object of this invention is to provide an improved braking scheme which affords stopping distances much shorter than those heretofore attainable, precludes wheel sliding and minimizes slipping, and does not require auxiliary devices of the type mentioned above. According to this invention the braking command controls the tangential velocities of the wheel treads, and the forces applied to the braking elements are controlled indirectly on an individual basis and as required to maintain equal the tangential speeds of all wheels. With this scheme, all of the wheels are compelled to accelerate at the same identical rate determined exclusively by the command; consequently, all of the variables, such as vehicle weight, coefficient of friction of the braking elements, and localized adhesion values, which influence motion of the vehicle are inherently and completed compensated. As a result, the actual acceleration of the vehicle is rendered independent of these conditions, and no apparatus need be provided to detect and correct specifially for them. In situations where local track or road conditions at a wheel are such that the commanded rate or retardation or acceleration cannot be supported, the wheel will simply cease to contribute to the total braking or accelerating effort, and its share of this effort will be apportioned among the remaining wheels. In no event will such a wheel slide, i.e., lock-up, and it can slip, i.e., rotate at a tangential speed less than vehicle speed, only in cases where all, or most, of the wheels on the vehicle are in a similar adhesionless state. This would be an extremely rare occurrence in the case of railway service, but it could happen in the case of an automobile or an aircraft. However, even in those applications, steering capability would be considerably better than under the sliding condition which the conventional system would create, and each wheel will be available immediately to again contribute braking effort as soon as it encounter ground conditions which provide the adhesion needed to support the commanded acceleration.

The basic principle of the invention is independent of the sense of vehicle acceleration, and therefore may be employed in the propulsion as well as the braking mode of of operation. This application of the new scheme is of particular importance in the case of railway rapid transit service, where all the axles of the individual cars are equipped with traction motors, because it affords an effective way of furnishing higher acceleration rates without jerks or wheel spin than heretofore possible. Furthermore, when these motors are used as dynamic brakes, the invention inherently modulates the friction brake as needed to offset changes in the effectiveness of the dynamic brake, and thus obviates inclusion of auxiliary brake-blending devices.

Regardless of whether the acceleration-imparting mechanisms associated with the wheels are friction brakes or propulsion motors or both, the preferred form of the invention uses a master command signal in the form of a variable frequency electrical signal. This signal is transduced by synchronous motors to provide, for each acceleration-imparting mechanism, rotary motion of an input shaft at a velocity proportional to the frequency. This input motion is compared to the motion of a feedback shaft which is driven at an angular velocity proportional to the tangential speed of the tread of the associated wheel, and an actuating mechanism adjusts the acceleration-imparting mechanism as required to maintain synchronized each pair of input and feedback shafts. The angular displacement of each input shaft is proportional to the cumulative cycles of the master signal, and the corresponding displacement of the feedback shaft is proportional to the linear travel of the wheel. Therefore, since the shafts are maintained synchronized within a small control range, it follows that this version of the invention not only affords the desired speed control, but also allows the distance traveled by the vehicle to be regulated by merely controlled the total number of cycles of the master signal. Obviously, this feature makes the invention particularly attractive for use in automatic train control systems.

BRIEF DESCRIPTION OF THE DRAWINGS

Several embodiments of the invention are described herein with reference to the accompanying drawings in which.

DETAILED DESCRIPTION OF ILLUSTRATED EMBODIMENT

As described herein, the invention is employed to control both the braking and the propulsion of a rapid transit passenger train which consists of a plurality of cars. It is assumed that each car has two trucks, and that each truck has a pair of independently driven axles. Except for the master signal generator, which is needed only on the control car, it will be understood that the disclosed system employs identical equipment on all cars.

Figure 1:
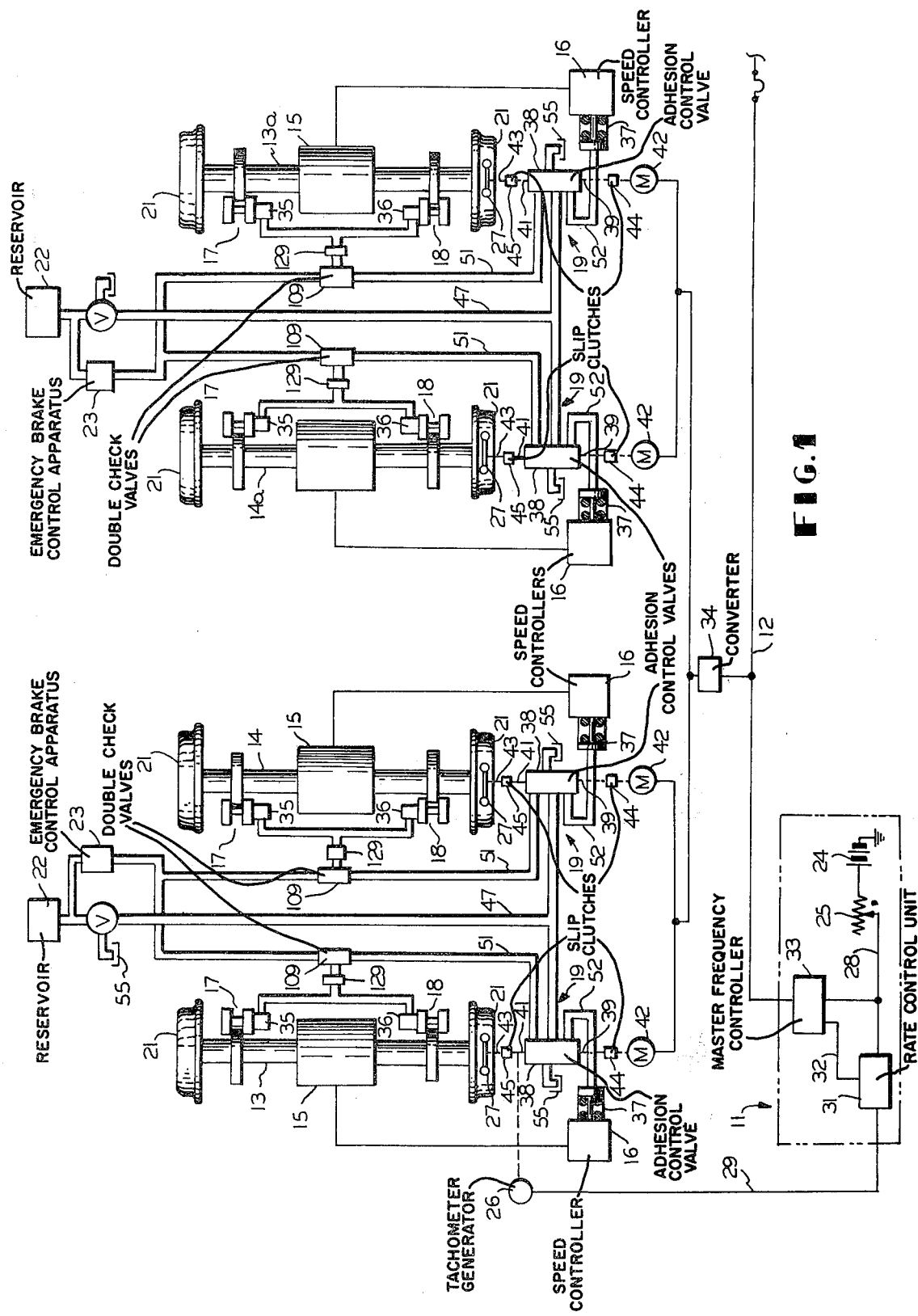
FIG. 1 is a schematic diagram showing that portion of a combined braking and propulsion control system carried by the control car of a typical rapid transit passenger train.

Referring to FIG. 1, the speed-controlling equipment carried by the control car may be divided into the following main groups:

a. a mster signal generator 11 which supplies to a trainlined control wire 12 an electrical signal having a frequency which represents desired train speed;

b. positive and negative acceleration-imparting means associated with each of the four axles 13, 14, 13a and 14a, and including a traction motor 15 equipped with a conventional speed controller 16, and a pair of caliper type disc brake units 17 and 18;

c. a controller 19 for each axle which serves to control the associated acceleration-imparting devices as required to maintain a predetermined relationship between the tangential speed of treads of the wheels 21 and the frequency of the master signal;

d. a source 22 of hydraulic fluid under pressure for the two controllers 19 of each truck; and e. emergency brake control apparatus 23 for the four disc brake units of each truck which acts independently of controllers 19 and supplies the brake units with motive fluid at a pressure modulated in accordance with the weight carried by the truck.

Master signal generator 11 includes means, represented simply by a battery 24 and a manually adjustable potentiometer 25, for developing a variable control voltage representing desired train speed, and apparatus such as a tachometer generator 26 which is driven by a sensor wheel 27 which engages the tread of one of the wheels 21 and produces a feedback voltage which varies directly with actual train speed. These two voltages are delivered via lines 28 and 29, respectively, to rate control unit 31 which compares them and develops on line 32 an output voltage which varies directly with the difference between the inputs. This output and the input signal on line 28 are supplied to a master frequency controller 33 which furnishes to control wire 12 a master signal whose frequency changes at a rate proportional to the magnitude of the control voltage on line 32 and which, under steady state conditions, is proportional to the desired speed signal on line 28. In a representative case, the components of generator 11 are so designed that the master frequency varies linearly with the voltage signal on line 32 from a minimum rate corresponding to a train acceleration of 0.5 miles per hour second to a maximum rate corresponding to a train acceleration of 3.5 miles per hour per second, and that said maximum rate is produced at all differences between desired and actual speed greater than 20 miles per hour.

The master signal on control wire 12 is delivered to a converter 34 on each car which translates it into 3-phase power at a corresponding frequency and delivers same as an input signal to the four controllers 19 carried by the car. Each of these controllers 19 includes a pair of hydraulic brake cylinders 35 and 36 incorporated in disc brake units 17 and 18, respectively, a third hydraulic actuator 37 which serves to adjust the setting for traction motor controller 16, and an adhesion control valve 38 which includes rotary input and feedback shafts 39 and 41, respectively, and serves to control the pressures in the three cylinders just mentioned as required to maintain synchronism between the shafts 39 and 41. Input shaft 39 is driven by a synchronous motor 42 which is supplied by converter 34, and thus rotates at a speed proportional to the frequency of the master signal on control wire 12. Feedback shaft 41, on the other hand, is driven through a torque-transmitting connection 43 by a sensor wheel 27 which engages the trend of one of the wheels 21 carried by the associated axle 13, 14, 13a or 14a. Therefore, the angular velocity of the feedback shaft is proportional to the tangential speed of the tread (i.e., the speed of the train). The drive connections to shafts 39 and 41 are equipped with slip clutches 44 and 45, respectively, in order to limit the torques applied to the shafts and thereby preclude damage to the components of valve 38 in the event of malfunction.

Figure 2:
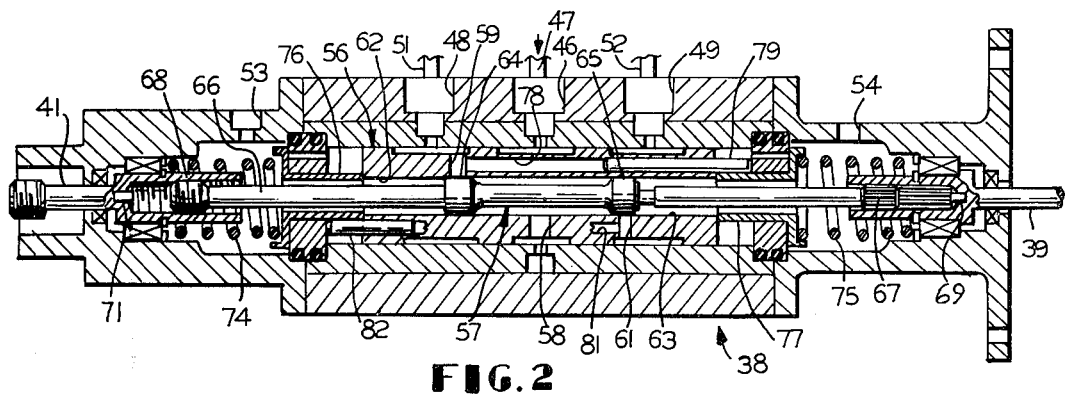
FIG. 2 is a sectional view of one of the adhesion control valves.
Figure 3:
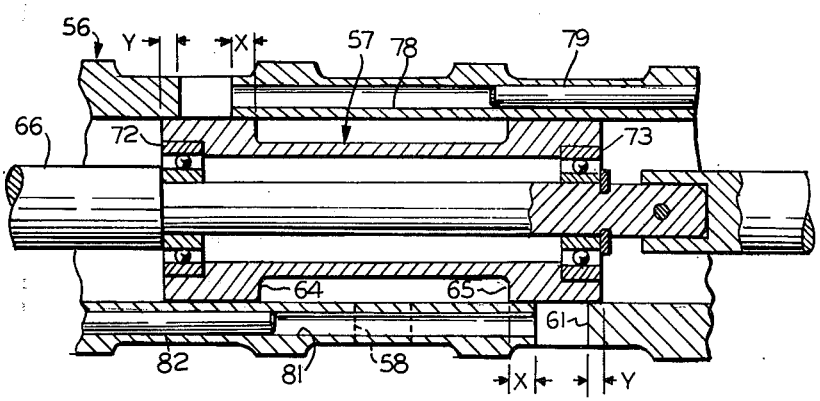
FIG. 3 is an enlarged sectional view of the valving elements of an adhesion control valve.

Referring to FIGS. 2 and 3, each adhesion control valve 38 comprises a body containing an inlet port 46 connected with the source 22 via a conduit 47, a pair of service ports 48 and 49 which are connected, respectively, with brake cylinders 35 and 36 and with cylinder 37 via conduits 51 and 52, and a pair of exhaust ports 53 and 54 which are connected with a hydraulic reservoir 55 incorporated in the source 22 for the associated truck. Fluid flow to and from the service ports is controlled by a pair of cooperating, reciprocable valving elements in the form of a sleeve 56 and a spool 57. The valve sleeve is formed with three axially spaced radial passages 58, 59 and 61 which are in continuous communication with ports 46, 48 and 49, respectively, and has interior spaces 62 and 63 at opposite ends of spool 57 which are in continuous communication with exhaust ports 53 and 54, respectively. Valve spool 57, on the other hand, is formed with a pair of control lands 64 and 65 which coact with the passages 59 and 61, respectively, to control flow therethrough. It will be noticed in FIG. 3 that these lands are wider than the associated passages, and that the overlap X at the inner margin of each passage is slightly greater than the overlap Y at the outer margin. When sleeve 56 is in the illustrated lap position relative to spool 57, lands 64 and 65 overlie passages 59 and 61, respectively, and therefore preclude flow to and from the service ports 48 and 49. As the spool moves to the left relatively to the sleeve, land 65 opens a path from passage 61 to sleeve space 63, to thereby connect service port 49 with exhaust port 54, and then land 64 opens a path from passagee 58 to passage 59 to thereby connect inlet port 46 with service port 48. Similarly, relative movement of the sleeve and spool in the opposite direction enables land 64 to first vent service port 48 to exhaust port 53, and then causes land 65 to open a supply path from inlet port 46 to service port 49.

Valve spool 57 is reciprocated by a two-piece rod 66, one end of which is coupled to input shaft 39 through a spline connection 67, and the other end of which is coupled to feedback shaft 41 through a threaded connection 68. The parts define a mechanical differential which shifts rod 66 to the left or the right depending upon whether input shaft 39 lags or leads feedback shaft 41. The range of motion of rod 66 is defined by a pair of pins 69 and 71 which are carried by shafts 39 and 41, and, for precise control of vehicle speed, it is essential that a small phase difference between the shafts will shift the rod full stroke. At present, it is considered acceptable to give the threads in connection 68 a pitch which accomplishes such translation of the rod during 40° deviation of wheel tread travel (i.e., a wheel travel of ± 40° will move the rod from the illustrated central position to the limit in eigher direction). The reciprocatory motion of rod 66 is transmitted to valve spool 57 through a pair of ball bearings 72 and 73, which, as shown in FIG. 3, are held on counterbores formed in the ends of the spool by a shoulder on one of the rod sections and a snap ring fitted into the mating rod section. The use of a bearing type of thrust connection is desirable because it permits relative rotation between the rod 66 and spool 57, and thereby prevents seizure between the spool and the sleeve at the high rotary speeds (e.g. speeds on the order of 2000 to 5000 r.p.m.) which rod 66 may encounter during service.

The valve sleeve 56 of each adhesion control valve 38 is biased to the illustrated central position with respect to the valve body by a pair of centering springs 74 and 75, which act upon its ends through flanged sleeves 76 and 77, respectively, and is shifted in opposite directions from that position by a pair of fluid pressure actuators. One actuator includes a cylinder 78 which is in continuous communication with sleeve passage 59 and a piston 79 which reacts against the valve body, and it serves to move sleeve 56 to the left from the central position. The other actuator includes a similar cylinder 81 and piston 82, but it responds continuously to the pressure in sleeve passage 61 and acts to shift sleeve 56 to the right from the central position. The actuators 78, 79 and 81, 82 and the centering springs 74 and 75 afford follow-up motion to sleeve 56 in response to the pressure at service ports 48 and 49 and act to maintain the sleeve in the lap position relative to spool 57. Therefore, since the displacement of spool 57 is proportional to the phase difference between shafts 39 and 41, it follows that valve 38 acts to graduate the pressure at one or the other of the service ports 48 and 49 directly in accordance with the relative movement between the shafts. The rate of change of pressure is determined by the rates of springs 74 and 75, and, in a representative embodiment, the springs are so selected that the pressure rises from 0 to 1000 p.s.i. as spool 57 is moved full stroke in either direction from the central position. As indicated above, the direction in which spool 57 moves from central position depends upon the sense of the phase difference between the shafts 39 and 41 and determines which of the service ports 48 and 49 is pressurized. In particular, service port 48 will be pressurized, and valve 38 will control brake units 17 and 18, when shaft 39 lags shaft 41, whereas service port 49 will be pressurized, and valve 38 will control the actuator 37 for the traction motors, when the input shaft leads the feedback shaft.

Figure 4:
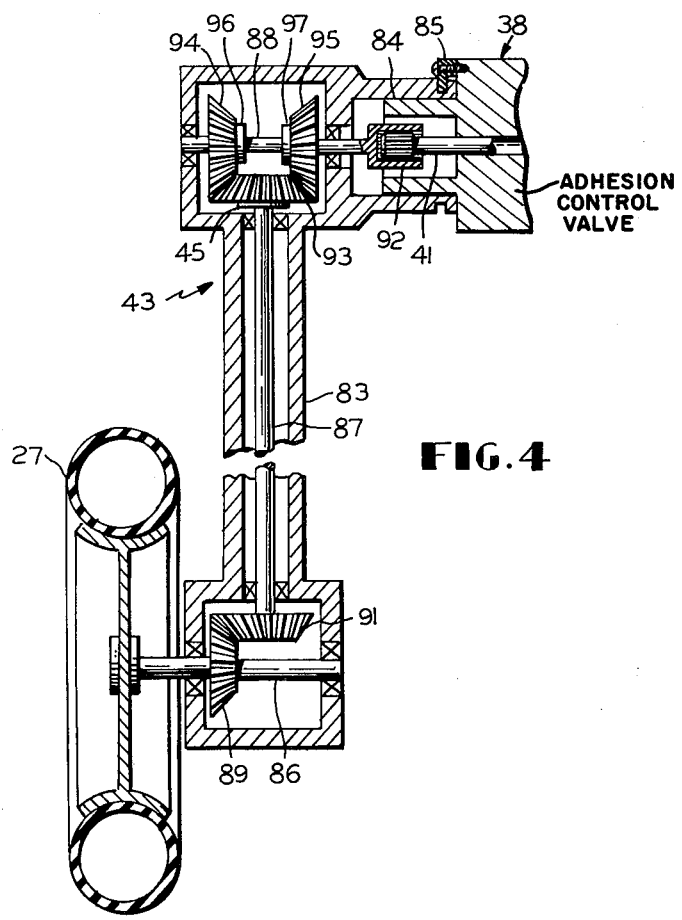
FIG. 4 is a sectional view, in diagrammatic form, of one of the wheel sensors.

As shown in FIG. 4, the drive connection 43 for the feedback shaft 41 of each adhesion control valve 38 is enclosed in an elongated housing 83 which, at one end, is mounted for pivotal movement on an extension 84 of the valve body and is held in place by a retainer 85, and at its opposite end carries bearings which support the axle 86 of sensor wheel 27. The drive train itself includes a pair of shafts 87 and 88, and two sets of bevel gears; shaft 87 being driven by axle 86 through the gears 89 and 91, and shaft 88 being connected with feedback shaft 41 by a spline coupling 92 and being driven by shaft 87 through gear 93 and one or the other of a pair of meshing gears 94 and 95. Gear 93 is coupled to shaft 87 through the slip clutch 45 mentioned earlier, and each of the associated gears 94 and 95 is coupled to shaft 88 through a oneway overrunning clutch 96 or 97. These overrunning clutches act in reverse senses so that the drive connection 43 always rotates shaft 41 in the same direction regardless of the direction of rotation of sensor wheel 27 (i.e., regardless of the direction of travel of the car). Sensor wheel 27 must follow very closely the vertical movement of the associated car wheel 21, for otherwise correspondence between the angular velocity of feedback shaft 41 and the tangential speed of the wheel tread cannot be maintained. Therefore, the weight of sensor wheel 27 and the components of drive connection 43 should be minimized, and housing 83 should pivot freely on body extension 84. It should also be realized that, for optimum control over vehicle speed, the gear train in drive connection 43 must afford step-up action because this makes insignificant the car wheel displacement corresponding to the control range of valve 38 (i.e., the phase difference between shafts 39 and 41 which causes the valve to increase output pressure from zero to the maximum).

Figure 5:
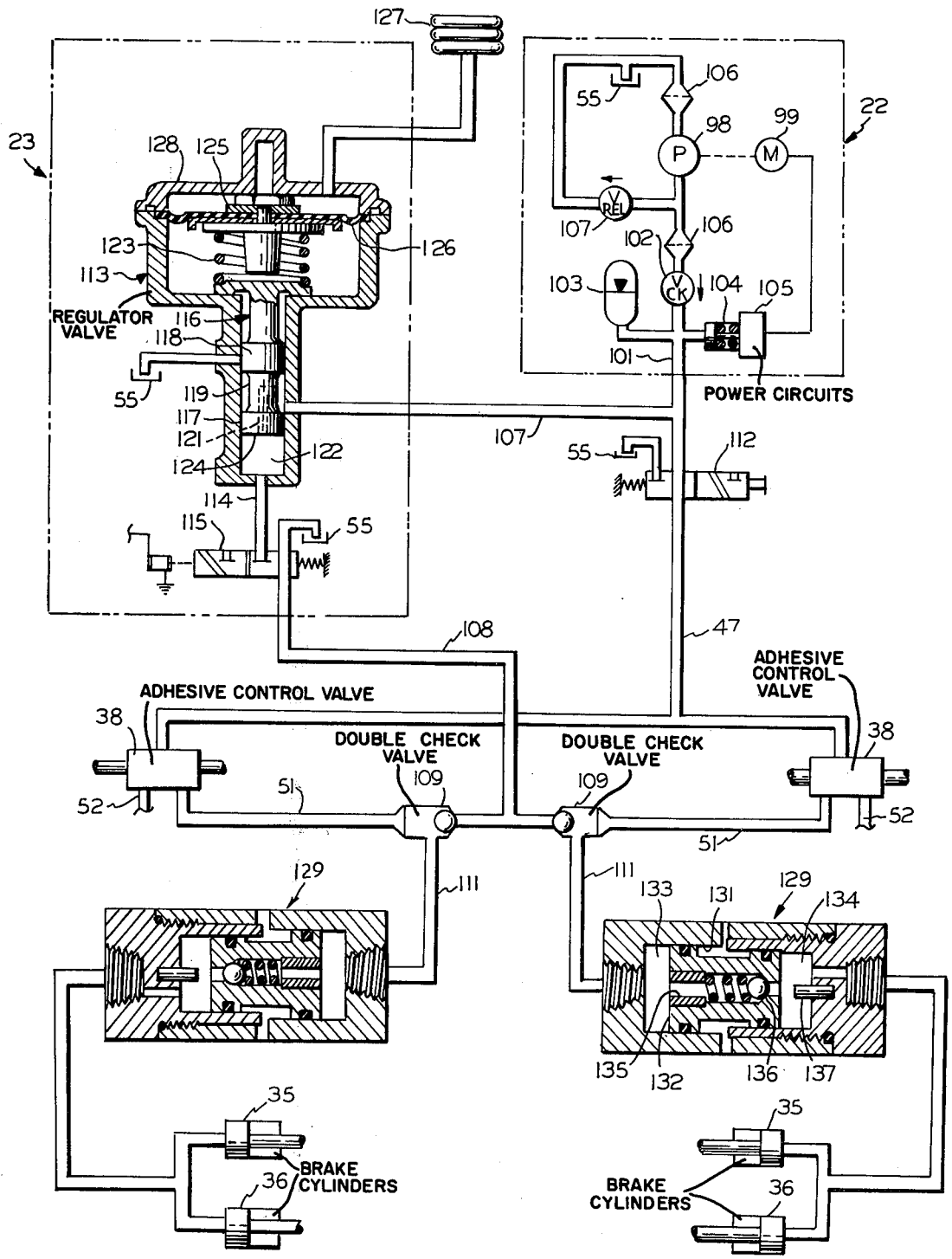
FIG. 5 is a schematic diagram of the complete hydraulic brake circuit for one of the trucks in the FIG. 1 system.

Referring to FIG. 5, the source 22 of hydraulic fluid of the two controllers 19 of each truck comprises a fixed delivery pump 98 which is driven by an electrical motor 99 and is arranged to draw fluid from reservoir 55 and deliver it under pressure to a discharge passage 101 which leads to supply conduit 47. Discharge passage 101 contains a check valve 102, and, at the downstream side of this valve, it communicates with a gas charged, piston type accumulator 103. An actuator 104, which responds to accumulator pressure, controls the power circuits 105 for drive motor 99, and, in combination with check valve 102, serves as a means for automatically loading and unloading pump 98 in accordance with the requirements of the accumulator. For reasons of safety, the accumulator should have a capacity sufficient to permit a reasonable number of brake applications after failure of pump 98 or its drive motor 99, and should be kept at least half charged at all time during normal operation. In the illustrated embodiment, it is suggested that the accumulator be precharged with gas to a pressure of 1200 p.s.i. and have a capacity sufficient to handle twenty brake applications, and that actuator 104 start and stop motor 99 at accumulator pressures of 1550 and 1700 p.s.i., respectively. The source 22 also includes a filter 106 in both the inlet and discharge lines of the pump, and a high pressure relief valve 107 which precludes development of damaging pressures in the event actuator 104 fails to shut off the pump at the intended pressure level.

It will be noted in FIGS. 1 and 5 that hydraulic fluid supplied by source 22 may be delivered to each of the associated sets of brake cylinders 35 and 36 via two paths one including supply conduit 47, adhesion control valve 38 and conduit 51, and the other including a portion of conduit 47, a branch conduit 107, the emergency brake control apparatus 23, and conduit 108. In each case, a double check valve 109 selectively connects the brake cylinder line 111 with conduit 51 of the first path or conduit 108 of the second path depending upon which of the last mentioned conduits is at the higher pressure. The first delivery path incorporates a manually operated valve 112 which normally connects the inlet ports 46 of the two adhesion control valves 38 with source 22, but affords a vent position in which those inlet ports are connected with reservoir 55. This valve, therefore, permits manual release of the brakes in cases where, because of a malfunction, the valving elements 56 and 57 of one or both of the associated adhesion control valves 38 are held in the relative position in which they connect service port 48 with inlet port 46. In contrast, the emergency brake control apparatus 23 of the second delivery path allows the brakes to be applied in cases where, malfunction causes the valving elements of the adhesion control valves to improperly assume the relative position in which service port 48 is vented to reservoir 55 via exhaust port 53. Emergency control 23 includes a regulator valve 113 which is adapted to deliver fluid from source 22 to an output conduit 114 at a pressure dependent upon the load carried by the truck with which it is associated, and a solenoid actuated emergency selector valve 115 which serves to connect conduit 108 with either reservoir 55 or the output conduit 114.

The pressure regulator 113 employed in the emergency brake control apparatus comprises a movable spool 116 formed with a pair of lands 117 and 118 separated by a peripheral groove 119, and an internal passage 121 which establishes continuous communication between groove 119 and an outlet chamber 122 with which conduit 114 is connected. Spool 116 has supply and exhaust positions in which, respectively, passage 121 connects chamber 122 with conduit 107 and reservoir 55, and an intermediate lap position in which lands 117 and 118 close both of these connections. A coil compression spring 123 biases spool 116 toward the illustrated supply position, and the force developed on end surface 124 by the output pressure chamber 122 shifts the spool upward to the other positions. Spring 123 has an adjustable seat 125 which is moved in the spring-compressing direction by a diaphragm 126 which responds to the pneumatic pressure in the air spring 127 of the associated truck. Therefore, the bias exerted by the spring, and consequently the output pressure in chamber 122, increases and decreases with the load carried by the truck. This modulating action of regulator 113 minimizes sliding of the wheels during emergency brake applications. However, it will be noted that modulation of the output pressure in the downward sense is limited by reason of the fact that seat 125 abuts the cap 128 of regulator 113, and thus retains a prescribed preload in spring 123, when air spring pressure reaches a predetermined low level. This arrangement insures that the emergency control 23 will furnish a braking pressure adequate for an empty car in the event air spring pressure is dissipated as a result of a leak or other malfunction.

Figure 6:
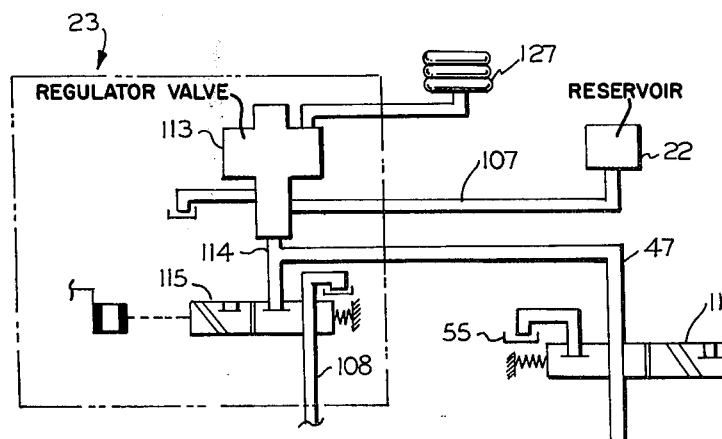
FIG. 6 is a schematic diagram showing an alternative arrangement of the emergency brake control apparatus.

It should be noted here that the adhesion control valves 38 automatically modulate brake cylinder pressure exactly as required to take account of all factors which influence train motion during a brake application. Therefore, in the preferred hydraulic circuit of FIG. 5, these valves are supplied with fluid at a pressure high enough to utilize to the greatest extent practical the retarding potential afforded by wheel-rail adhesion. In other words, the weight modulated supply pressures are utilized only during emergency brake applications. However, it must be realized that, if the normal modulating action of an adhesion control valve 38 is impaired in a way that results in fully supply pressure being applied to brake cylinders 35 and 36, the wheels will lock-up and slide. If this risk is considered intolerable, the system may employ the supply circuit of FIG. 6, wherein the adhesion control valves 38 receive the modulated output of regulating valve 113. However, since this alternative permits the regulating valve to override the adhesion control valves even under normal operating conditions, it does prevent the system from affording the full braking effort which it is capable of providing and which rail-wheel adhesion will support.

Precise speed control action demands very quick system response, and this, in turn, means that the volume of hydraulic fluid which must be moved during a control cycle be kept to a minimum. In view of this, the brake apparatus must incorporate slack adjusters which offset the effect of wear on shoe clearance, and thereby prevent such wear from increasing the flow demands of the brake cylinders. The illustrated embodiment (see FIG. 5) employs a double-acting hydraulic slack adjuster 129 for each set of brake cylinders 35 and 36 which is interposed between the line 111 and the brake cylinders and which is constructed in accordance with the teachings in my co-pending application Ser. No. 302,415, filed Oct. 31, 1972, now abandoned in favor of continuation application Ser. No. 483,843, filed June 21, 1974. Each slack adjuster comprises a stepped cylinder 131 containing a reciprocable, differential area piston 132 which divides the cylinder into a pair of working spaces 133 and 134. The working space 133 at the larger diameter end of cylinder 131 is connected with line 111, and the smaller diameter space 134 is connected with cylinders 35 and 36. Extending through piston 132 is a transfer passage 135 which is controlled by a combined transfer and relief valve 136. This valve may be opened by a predetermined differential (e.g. 12 p.s.i.) between the pressures in the working spaces, to thereby permit escape of fluid from space 134, or it may be opened by a mechanical actuator 137, to thereby permit fluid flow into space 134. During a brake application, the fluid under pressure delivered to working space 133 shifts piston 132 toward space 134 and displaces oil from the latter into brake cylinders 35 and 36. If existing shoe clearance is greater than desired, piston 132 will reach the end of this stroke before the brakes are applied, actuator 137 will open valve 136, and the additional oil needed to take-up clearance and set the brakes will be transferred from space 133 to the brake cylinders through passage 135. On the other hand, if clearance is less than desired, the shoes will contact the disc before piston 132 reaches the limit of its application stroke, the pressure in space 134 will rise above that prevailing in space 133 as a result of the area differential of piston 132, and the differential pressure will open valve 136. When this happens, oil will be transferred from space 134 to space 133 through passage 135 as needed to allow piston 132 to complete its stroke. Thus, in each case, piston 132 comes to rest in its limiting position. Consequently, when the brakes are released, cylinders 35 and 36 always will retract a uniform distance proportional to the stroke of piston 132, and a specified shoe clearance will be maintained. The relief action of valve 135 also is a desirable feature because it allows shoe clearance to be intentionally increased as required for shoe replacement by manually retracting the cylinders with a pry bar. This procedure, of course, cannot be carried out unless the elements 56 and 57 of the associated adhesion control valve 38 are in the position in which service port 48 is vented to reservoir 55, but that condition can be satisfied easily by manually lifting sensor wheel 27 from the tread of car wheel 21 and rotating it by hand until valve spool 57 is shifted to the required position.

OPERATION OF ILLUSTRATED EMBODIMENT

In order to start a train equipped with the FIG. 1 system, the operator sets potentiometer 25 of master signal generator 11 to the position corresponding to desired train speed, thereby causing controller 33 to apply to trainlined control wire 12 a master signal whose frequency increases from zero at a rate determined by the output voltage developed by unit 31. This signal causes the converters 34 to apply power to the synchronous motors 42, so the latter now rotate the shafts 39 of the adhesion control valves 38 relatively to the feedback shafts 41 in a sense that causes valve spool 57 to move to the right in FIG. 2 relatively to the associated sleeve 56. This action connect service ports 49 and 48 with inlet port 46 and exhaust port 53, respectively, and thus effects venting of brake cylinders 35 and 36 and pressurization of the associated actuator 37 for the traction motor controller 16. These controllers, therefore, start traction motors 15 and cause them to accelerate the train.

During the initial acceleration period, there are three interrelated reactions of the system equipment which deserve attention. First, in response to the rising pressure at each service port 49, the associated actuator 37 increases the current setting of the traction motor controller 16, and thereby causes motor torque to increase. Second, this same rising pressure is sensed by follow-up actuator 81, 82 and, in response thereto, it moves valve sleeve 56 toward lap position against the bias of centering spring 75. Third, in response to motion of the train, the sensor wheels 27 accelerate feedback shafts 41 toward the angular velocity of the input shafts 39. The net effect of these reactions is to cause train speed to increase at a rate corresponding to the rate of change of the frequency of the master signal applied to control wire 12. As the train accelerates toward the selected speed, the output of tachometer 26 increases, the rate voltage developed by unit 31 decreases, and controller 33 reduces the rate of change of the frequency of the master signal. Because of this, the train is caused to accelerate at a decreasing rate as the desired speed is approached, and jerks are minimized.

When the train reaches the desired speed, controller 33 will have established a master frequency proportional to the voltage on line 28, the input and feedback shafts 39 and 41 will be rotating at equal angular velocities corresponding thereto, and the follow-up actuators 81, 82 of valves 38 will have moved sleeves 56 into lap positions relative to the coacting spools 57. Since all of the wheels are rotating at the same tangential speed, and this speed is determined solely by the master frequency on control wire 12, it follows that train speed will correspond to the selected setting of potentiometer 25. If this setting is increased, controller 33 will again raise master frequency at a rate dictated by unit 31, the speed of synchronous motors 42 will increase, and the adhesion control valves 38 will raise the pressures in actuators 37 as needed to equalize the angular velocities of input and feedback shafts 39 and 41. As before, the train will accelerate at a decreasing rate as its speed approaches the selected new level. When that speed is attained, all of the input and feedback shafts 39 and 41 will be rotating at an angular velocity corresponding to the new frequency, and the valving elements 56 and 57 of all of the valves 38 will be in lap position.

If, when the train is operating in the propulsion mode, local rail conditions do not provide the adhesion necessary to support the tractive effort of a particular wheel 21, that wheel will accelerate momentarily and cause the feedback shaft 41 of the associated adhesion control valve 38 to lead input shaft 39. This relative movement of the shafts will cause valve spool 57 to shift away from lap position relative to spool 56 in a direction which opens an exhaust path from service port 49 to exhaust port 54. As a result, the pressure at actuator 37, and consequently, the speed of the associated traction motor 15, will be reduced until the speeds of shafts 39 and 41 are brought into synchronism. This action precludes spinning of the offending wheel 21. This wheel, however, now contributes nothing to the total tractive effort, and therefore train speed momentarily will tend to lag the commanded speed. This transient will immediately cause the other adhesion control valves 38 to increase the pressures at their actuators 37 as needed to enable the remaining traction motors to keep the train moving at the speed corresponding to the prevailing master frequency. As soon as the adhesion necessary to support tractive effort by the inactive wheel is restored, that wheel will immediately become active and provide such effort. Of course, reestablishment of traction will be followed by a transient period in which the adhesion control valve 38 for the previously inactive wheel 21 will increase the pressure at its actuator 37, and the remaining adhesion control valves 38 will effect offsetting decreases in the pressures at their actuators. From this discussion it should be evident that the system serves automatically to prevent spinning of a wheel or a group of wheels, which cannot support the commanded tractive effort and to apportion the lost contribution of the inactive wheel or wheels among the remaining wheels. Of course, if the number of active wheels is so small that their individual tractive efforts are increased beyond the limit which adhesion can support, spinning of all wheels could occur. However, since such a condition requires that all, or at least most, of the wheels of the train are on slippery rail, the risk that it will be encountered is very small. And, even if it were encountered, spinning could only occur at the desired controlled speed called for by the master control frequency, which could not be vastly different from actual train speed, rather than taking place in runaway fashion as with present control systems.

In order to effect a service (i.e., non-emergency) application of the brakes, the engineer manipulates potentiometer 25 in a direction to reduce the voltage on line 28 and thereby cause controller 33 to decrease the frequency of the master signal. As before, the rate of change of frequency is determined by the output voltage of unit 31. The change in master signal frequency effects a corresponding decrease in the speed of synchronous motors 42, and thus causes the feedback shafts 41 to lead momentarily their input shafts 39. As a result, the spool 57 of each adhesion control valve will be shifted to the left in FIG. 2 relative to sleeve 56 to thereby, first, vent actuators 37, and reduce to zero the power output of traction motors 15, and then open a supply path from inlet port 46 to service port 48. Now, fluid under pressure is delivered to brake cylinders 35 and 36, the brake units 17 and 18 reduce wheel speed, and follow-up actuator 78, 79 becomes effective to move sleeve 56 toward lap position. As in the propulsion mode, the pressure at the active service port of each valve 38 will be automatically graduated as required to maintain the angular velocities of shafts 39 and 41 equal. As a result, train speed is forced to change at the rate dictated by the rate of change of master signal frequency. After the train reaches the speed corresponding to the new setting of potentiometer 25, the tangential speeds of the wheels will decrease slightly below the desired speed, and the feedback shafts 41 of valves 38 will commence to lag the input shafts 39. In response to this condition, the valve spools 57 will be shifted to the right relative to the sleeves 56 in FIG. 2 and, in sequence, effect dissipation of brake cylinder pressure and re-pressurization of actuators 37. Therefore, the brakes will be released, and traction motors 15 will again deliver power to the wheels. As before each adhesion control valve 38 will graduate the pressure at actuator 37, and thus control the associated traction motor 15, as needed to maintain the angular velocities of its input and feedback shafts 39 and 41 equal. In short, the system will keep the train moving at the speed corresponding the new steady state frequency of the master signal.

In cases where the operator wishes to bring the train to a stop, he merely moves the wiper of potentiometer 25 to its zero voltage position. In this case, controller 33 reduces the master frequency to zero, and each adhesion control valve 38 changes the pressure in the associated brake cylinders 35 and 36 as needed to compel the wheels 21 to slow to a stop in step with the decrease in master frequency. As in the case of any commanded change in train speed, the rate of change of master frequency decreases to a predetermined minimum as the target speed (i.e., the speed commanded by potentiometer 25) is approached; therefore the train will come to rest smoothly without jerks cause by slack action on the couplings between cars or by changes in the coefficient of friction of the shoes. When the train stops, the spool 57 of each adhesion control valve will be in a position to the left of the central position illustrated in FIG. 2, follow-up actuator 78, 79 will have moved sleeve 56 to the lap position relative to the spool, and each of the brake cylinders 35 and 36 will be maintained at the pressure level it required during the terminal portion of the preceding acceleration period. Thus, the brakes 17 and 18 will be applied.

If, during a brake application, one of the car wheels 21 should tend to slip, the feedback shaft 41 of the associated adhesion control valve 38 will momentarily lag the input shaft 39, and spool 57 will be moved from the lap position relative to sleeve 56 in a direction to open the exhaust path from service port 48 to exhaust port 53. This action reduces brake cylinder pressure, and as a result, equalizes the angular velocities of the shafts 39 and 41. Therefore, the wheel 21 will be kept rotating at the speed corresponding to the master frequency although it, of course, will not contribute to the total retarding effort since, under the assumed conditions, its adhesion is insufficient to support the commanded rate of acceleration. In a manner similar to that described earlier with respect to the propulsion mode, the system now will automatically change (in this case increase) the output pressures of the other adhesion control valves 38 as needed to apportion the acceleration-imparting effort of the inactive wheel among the remaining wheels. Thus, except in the very unusual situation wherein all, or most, of the wheels 21 of the train are on slippery track which is incapable of supporting the commanded acceleration, no slipping of any wheel will occur. Moreover, since the system keeps the wheels rotating even though they fail to contribute to the retardation effort, lock-up and sliding can never occur. When adhesion is restored at the offending wheel 21, feedback shaft 41 will immediately commence to lead input shaft 39, thereby causing valve spool 57 to shift relatively to sleeve 56 and increase the pressure at service port 48 as required to keep the speeds of the two shafts synchronized. In other words, as soon as the local slippery condition abates, wheel 21 immediately will again contribute to the total retardation effort. At this time, of course, the system will act to reduce slightly the pressures in the remaining cylinders 35 and 36 as required to exactly offset the effect on train motion of restoration of adhesion at the previously inactive wheel 21.

It should be observed that the traction motors 15 used in the FIG. 1 system normally will be equipped with dynamic braking circuits so that the motors, acting as generators, will contribute at least a portion of the total retardation effort during the braking mode. The disclosed system automatically compensates for the action of such an auxiliary brake by merely modulating the efforts of the friction brakes 17 and 18 as needed to ensure that the total braking effort causes the wheels to accelerate in accordance with the commanded decrease in master frequency.

Although the illustrated system employs an on-board generator 11 to produce and control the master signal in accordance with the wishes of the engineer, it should be evident that various other arrangements may be employed. For example, the master signal may be produced at a trackside site and transmitted to receiving equipment on the train. Another alternative uses only the braking portion of the illustrated system and operates it in response to a conventional P-wire signal. In this case, the system would include apparatus which establishes a master frequency corresponding to train speed when P-wire current is a maximum, and which reduces that frequency to zero at a variable rate which depends upon the selected reduction in P-wire current. In this connection, the braking system of the invention may be the only friction braking apparatus, or it may serve as a slip control for a conventional brake. In the last mentioned alternative, the adhesion control valves 38 would be supplied with the hydraulic output of the primary brake equipment which response to P-wire current, rather than the output of a constant pressure source 22, and would serve merely to modulate the pressure at which that fluid is delivered to the brake cylinders as needed to prevent the wheels 21 from slipping.

It shouls also be observed that the disclosed system inherently provides a convenient scheme for controlling the distance traveled by the train. This attribute stems from the fact that, except for the small control range of the adhesion control valve 38, the positions of the input and feedback shafts 39 and 41 are maintained synchronized. Since the displacement of the input shaft 39 is proportional to the number of cycles of power received by the associated synchronous motor 42, and the displacement of the feedback shaft 41 is proportional to the translation of the associated wheel 21 along the track, it follows that the position of the train, or the distance it has traveled, is directly proportional to the cumulative number of cycles and can be monitored by merely counting the cycles of the master signal.

Having thus described a method and apparatus for controlling the speed of a vehicle as a preferred embodiment of the present invention, it is to be understood that various modifications and alterations may be made to the specific embodiment shown without departing from the spirit or scope of the invention.

What is claimed is:

1. A vehicle control system having a motor and brakes for providing tractive power and braking selectively for at least one wheel of a vehicle and apparatus governing the motor and brakes in accordance with sensing desired and actual vehicle speeds wherein the improvement comprises;

a. adhesion control valve means having an input fluid supply port, a first output fluid pressure port for governing brakes of the wheel and a second output fluid pressure port for governing tractive power of the motor,
   b. the adhesion control valve means having coaxial input shafts at opposite ends thereof rotated in the same direction in accordance with sensed actual and desired speeds respectively for the wheel of the vehicle,
   c. the adhesion control valve means comprising differential sensing means for sensing whether rotation of the desired speed shaft is lagging or leading the actual speed shaft and in accordance therewith for selecting output fluid pressure to be applied to the first or second output ports respectively, and
   d. the differential sensing means being operable to deliver an output fluid pressure proportional to the angular velocity difference in rotation of the two input shafts.

2. A vehicle control system according to claim 1 wherein the adhesion control means has spool valve means for selectively lapping and opening passages from the supply port to the first and second output ports and means is provided for movement of the spool valve means axially in accordance with an angular velocity difference in the rotation of the input shafts.

3. A vehicle control system according to claim 2 wherein the differential sensing means comprises an axially operable sleeve coaxial with the spool valve means and biased to an intermediate position having means for governing fluid pressure output of the adhesion control valve means in proportion to the angular velocity difference in rotation of the input shafts.

4. A vehicle control system according to claim 3 wherein the sleeve comprises an axial bore and piston operable therein for pressurizing fluid applied to a selected output port in accordance with the extent of angular velocity difference in the rotation of the input shafts 5. A vehicle control system according to claim 4 wherein the fluid is pressurized by actuation of one or the other of biasing springs at the end of the sleeve bearing upon the piston.

* * * * *